US011175500B2

(12) United States Patent
Harada et al.

(10) Patent No.: US 11,175,500 B2
(45) Date of Patent: Nov. 16, 2021

(54) DISPLAY DEVICE AND DISPLAY METHOD OF THE SAME

(71) Applicant: Japan Display Inc., Minato-ku (JP)

(72) Inventors: Tsutomu Harada, Tokyo (JP); Kazuhiko Sako, Tokyo (JP)

(73) Assignee: Japan Display Inc., Minato-ku (JP)

( * ) Notice: Subject to any disclaimer, the term of this patent is extended or adjusted under 35 U.S.C. 154(b) by 65 days.

(21) Appl. No.: 16/730,237

(22) Filed: Dec. 30, 2019

(65) Prior Publication Data

US 2020/0132995 A1    Apr. 30, 2020

Related U.S. Application Data

(63) Continuation of application No. 15/617,468, filed on Jun. 8, 2017, now Pat. No. 10,564,416.

(30) Foreign Application Priority Data

Jun. 9, 2016  (JP) ................................. 2016-115279

(51) Int. Cl.
*G02B 27/01* (2006.01)
*G03B 21/14* (2006.01)
(Continued)

(52) U.S. Cl.
CPC .......... *G02B 27/0101* (2013.01); *B60K 35/00* (2013.01); *B60K 37/02* (2013.01); *G03B 21/147* (2013.01); *H04N 9/315* (2013.01); *H04N 9/3108* (2013.01); *H04N 9/3138* (2013.01); *H04N 9/3182* (2013.01); *B60K 2370/155* (2019.05); *B60K 2370/1529* (2019.05); *B60K 2370/23* (2019.05); *B60K 2370/334* (2019.05); *B60R 2300/205* (2013.01); *G02B 5/04* (2013.01); *G02B 2027/011* (2013.01); *G02B 2027/0112* (2013.01); *G02B 2027/0116* (2013.01);
(Continued)

(58) Field of Classification Search
CPC .......... G02B 27/0101; G02B 2027/011; G02B 2027/0112; G02B 2027/0116; G02B 2027/0127; G02B 2027/0181; G02B 5/04; G03B 21/147; G03B 21/28; B60R 2300/205
USPC ....................................................... 359/630
See application file for complete search history.

(56) References Cited

U.S. PATENT DOCUMENTS 5,153,775 A    10/1992  Itami
5,497,170 A     3/1996  Kato
(Continued)

FOREIGN PATENT DOCUMENTS

JP        7-98440     4/1995
JP     2006-208583    8/2006
(Continued)

*Primary Examiner* — Zachary W Wilkes
(74) *Attorney, Agent, or Firm* — Oblon, McClelland, Maier & Neustadt, L.L.P.

(57) ABSTRACT

According to one embodiment, when displaying an image on a display panel, projecting an image which is displayed on the display panel, inclining the image which is projected from the display panel at a predetermined angle of bend, and reflecting the image which is projected from the display panel via a prism and guiding the image to a projection surface, a display device corrects input picture image of the prism based on characteristics contrary to the chromatic aberration characteristics of the prism.

7 Claims, 7 Drawing Sheets

(51) Int. Cl.
  *G02B 5/04*  (2006.01)
  *G03B 21/28*  (2006.01)
  *H04N 9/31*  (2006.01)
  *B60K 35/00*  (2006.01)
  *B60K 37/02*  (2006.01)

(52) U.S. Cl.
  CPC ............... *G02B 2027/0127* (2013.01); *G02B 2027/0181* (2013.01); *G03B 21/28* (2013.01)

(56) References Cited

U.S. PATENT DOCUMENTS

| | | |
|---|---|---|
| 6,134,051 A | 10/2000 | Hayakawa |
| 6,147,807 A | 11/2000 | Droessler |
| 6,590,724 B2 | 7/2003 | Togino |
| 6,836,369 B2 | 12/2004 | Fujikawa |
| 9,836,828 B2 | 12/2017 | Jones |
| 10,564,416 B2 * | 2/2020 | Harada ................ H04N 9/3108 |
| 2004/0239583 A1 * | 12/2004 | Shelton .............. G02B 27/0101 345/7 |
| 2010/0091027 A1 | 4/2010 | Oyama |
| 2011/0051029 A1 | 3/2011 | Okumura |
| 2014/0176862 A1 | 6/2014 | Uehara |
| 2014/0204465 A1 * | 7/2014 | Yamaguchi ........ G02B 27/0101 359/633 |
| 2017/0225568 A1 * | 8/2017 | Kasahara ............... G02B 27/01 |
| 2017/0242246 A1 * | 8/2017 | Harada ................... G02B 5/02 |
| 2017/0336628 A1 | 11/2017 | Kim |
| 2017/0359558 A1 * | 12/2017 | Harada ................ H04N 9/3138 |

FOREIGN PATENT DOCUMENTS

| | | |
|---|---|---|
| JP | 2011-53386 | 3/2011 |
| JP | 2014-126716 | 7/2014 |

* cited by examiner

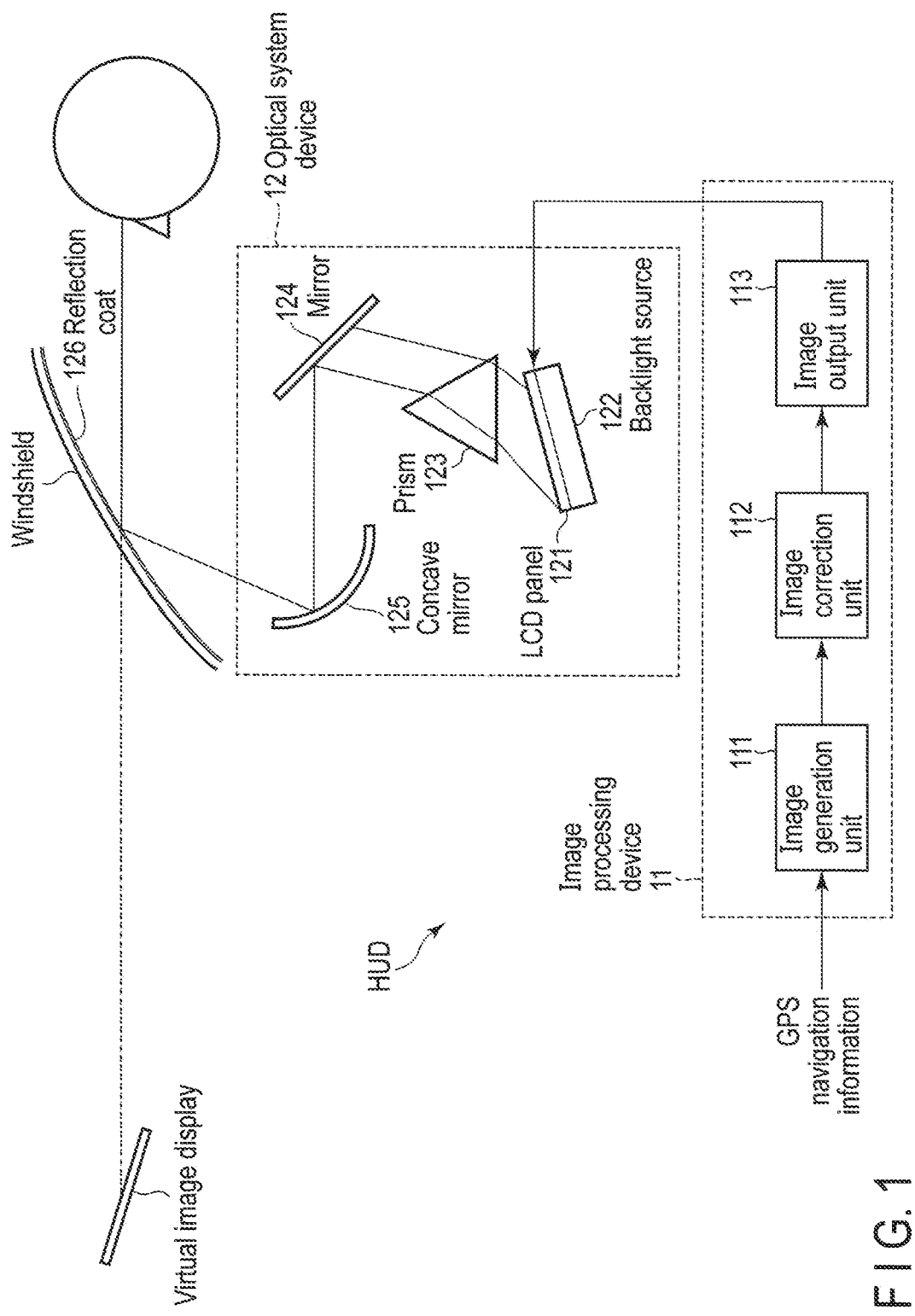
F I G. 1

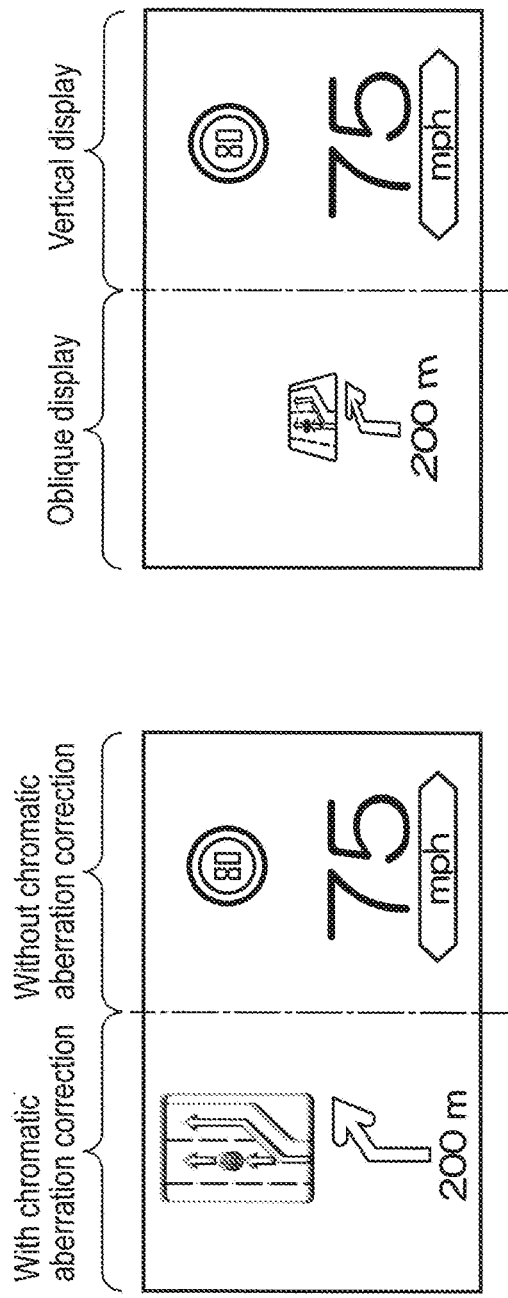
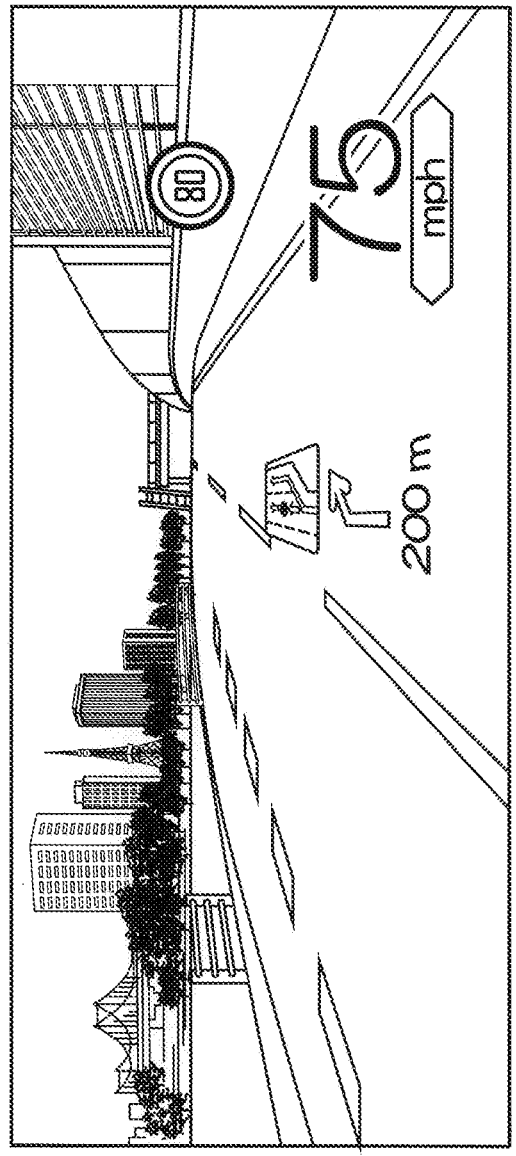
FIG. 9A
FIG. 9B
FIG. 9C

DISPLAY DEVICE AND DISPLAY METHOD OF THE SAME

CROSS-REFERENCE TO RELATED APPLICATIONS

The application is a continuation of U.S. application Ser. No. 15/617,468 filed Jun. 8, 2017 and is based upon and claims the benefit of priority from Japanese Patent Application No. 2016-115279, filed Jun. 9, 2016, the entire contents of each of which are incorporated herein by reference.

FIELD

An embodiment described herein relates generally to a display device adopting a head-up display mainly for automobile use, and a display method of the same.

BACKGROUND

In general, a display device adopting an automotive-use head-up display (HUD) projects a picture image (virtual image) such as a navigation instruction and a lane departure warning on the windshield of a vehicle and displays the picture image to be superimposed on the driver's view (real view) ahead of the vehicle. In this way, the driver can check a navigation instruction, a warning and the like without making a large movement of the eyes or a great adjustment of the focus of the eyes, and this contributes to an improvement in the safety of the driver.

In the meantime, a display device adopting a recent HUD does not simply display a picture image on the windshield but displays a picture image such that the picture image is superimposed on the driver's view, that is, on the view of the road ahead of the vehicle at a distance of about four meters. However, since the picture image is always displayed as an upright image, when superimposed on the driver's view with a sense of depth such as the view of the road, the picture image may be confusing to the driver in some cases.

As described above, in conventional display devices adopting HUDs, since a picture image is displayed as an upright image on the windshield, there is a case where the driver finds the picture image confusing with respect to the driver's view with a sense of depth such as the view of the road.

Therefore, the present embodiment aims to provide a display device and a display method of the same which can display a picture image on a windshield intelligibly according to a real image with a sense of depth.

BRIEF DESCRIPTION OF THE DRAWINGS

FIG. 1 is a block diagram showing the general structure of a display device adopting a HUD of an embodiment.

FIGS. 9A, 9B, and 9C are diagrams showing an image displayed on the panel, an image projected from the panel, and an actual image superimposed on the driver's view in a case where a part of the image displayed on the panel is inclined as shown in FIG. 8.

DETAILED DESCRIPTION

Figure 2:
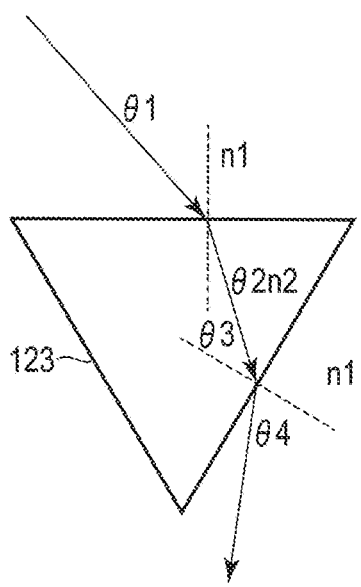
FIG. 2 is an explanatory diagram showing an angle of bend for a prism used in an optical system device of the display shown in FIG. 1.

Various embodiments will be described hereinafter with reference to the accompanying drawings.

According to the embodiments, a display device includes an image processing device and an optical system device. The image processing device includes an image generation unit which generates an image which is to be displayed, an image correction unit which corrects the generated image, and an image output unit which outputs the corrected image. The optical system device includes a display panel which displays the image which is output from the image output unit, a backlight source which projects the image which is displayed on the display panel, a prism which inclines the image which is projected from the display panel at a predetermined angle of bend, and a group of mirrors which reflects the image which is projected from the display panel via the prism and guides the image to a projection surface. The image correction unit corrects the input picture image of the prism based on characteristics contrary to the chromatic aberration characteristics of the prism. As for the output picture image of the prism, chromatic aberration reduced by this.

Further, according to the embodiments, when displaying an image on a display panel, projecting the image which is displayed on the display panel, inclining the image which is projected from the display panel at a predetermined angle of bend, and reflecting the image which is projected from the display panel via a prism and guiding the image to a reflection surface, the display methods includes correcting the input picture image of the prism based on characteristics contrary to the chromatic aberration characteristics of the prism.

According to the above-described structure, the display device can obliquely display the picture image in conformity to the driver's view such as the view of the road.

Embodiments will be described hereinafter with reference to the accompanying drawings.

First Embodiment

FIG. 1 is a block diagram showing the general structure of a display device adopting a HUD of the first embodiment. The HUD shown in FIG. 1 includes an image processing device 11 and an optical system device 12. The image processing device 11 includes an image generation unit 111, a correction processing unit 112, and an image output unit 113. The image generation unit 111 generates a display image according to a current location which is obtained by a positioning system such as the GPS. The correction processing unit 112 applies chromatic aberration correction to a part of or a whole image which is generated by the image generation unit 111 as needed. The image output unit 113 outputs an image to which the chromatic aberration correction is applied as needed.

The optical system device 12 includes a liquid crystal display (LCD) panel 121, a backlight source 122, a prism 123, a mirror 124, a concave mirror 125, and a reflection film 126. The LCD panel 121 displays an image which is output from the image output unit 113. The backlight source 122 projects an image which is displayed on the LCD panel 121. The prism 123 is an equilateral triangular prism, and inclines a part of or a whole projection image of the LCD panel 121 at a predetermined angle of bend. The mirror 124 reflects in a predetermined direction, an image which is projected from the LCD panel 121 and is inclined by the prism 123 and an image which is projected from the LCD panel 121 and is not transmitted via the prism 123. The concave mirror 125 enlarges an image which is reflected off the mirror 124 and reflects the enlarged image in a predetermined direction. The inner side of the windshield of the vehicle is coated with the reflection coat film 126, and the reflection film 126 reflects a projection image from the concave mirror 125 in the driver's line of sight.

The mirror 124 and the concave mirror 125 secure the distance to the projection surface such that the projection image can provide the driver with a sense of depth. Although two mirrors are used in the present embodiment, the number of mirrors can be increased or reduced depending on the restriction of the installation place, and the required distance.

In the above-described structure, the angle of bend for the prism 123 is calculated by the following equations. Here, as shown in FIG. 2, the section is an equilateral triangle, the refractive index of air is n1, the refractive index of the prism 123 is n2, the angle of incidence on the prism 123 is θ1, the angle of emergence into the prism 123 is θ2, the angle of incidence on the prism 123 is θ3, the angle of emergence from the prism 123 to the outside is θ4.

In this case, the following equation is established:

$n1 \sin(\theta1) = n2 \sin(\theta2)$.

According to the above equation, θ2 can be expressed as follows:

$\theta2 = \arcsin(n1 \sin(\theta1)/n2)$     (1).

Here, if n1=1 and n2=1.5,
$\theta2 = \arcsin(\sin(\theta1)/1.5)$.
When θ1=60°,
θ2=35.3°.
Therefore, the angle of bend is about 25°.
Similarly, the following equation is established:

$n2 \sin(\theta3) = n1 \sin(\theta4)$.

According to the above equation, θ4 can be expressed as follows:

$\theta4 = \arcsin(n2 \sin(\theta3)/n1)$     (2).

Here, if n1=1 and n2=1.5,
$\theta4 = \arcsin(1.5 \sin(\theta3))$.
When θ2=35.3°,
$\theta3 = 180 - (120+\theta2) = 60 - \theta2 = 24.7°$     (3).

Therefore, θ4=38.8°.
Consequently, the angle of bend α according to θ1 to θ4 is derived as follows:

$\alpha = \theta1 + \theta4 - 60 = 38.8°$.

Further, according to the above equations (1), (2), and (3), the angle of bend α can be expressed as follows:

$\alpha = \theta1 + \theta4 - 60 = \theta1 + \arcsin(n2 \sin(60 - \arcsin(n1 \sin(\theta1)/n2)/n1) - 60$.

Figure 3:
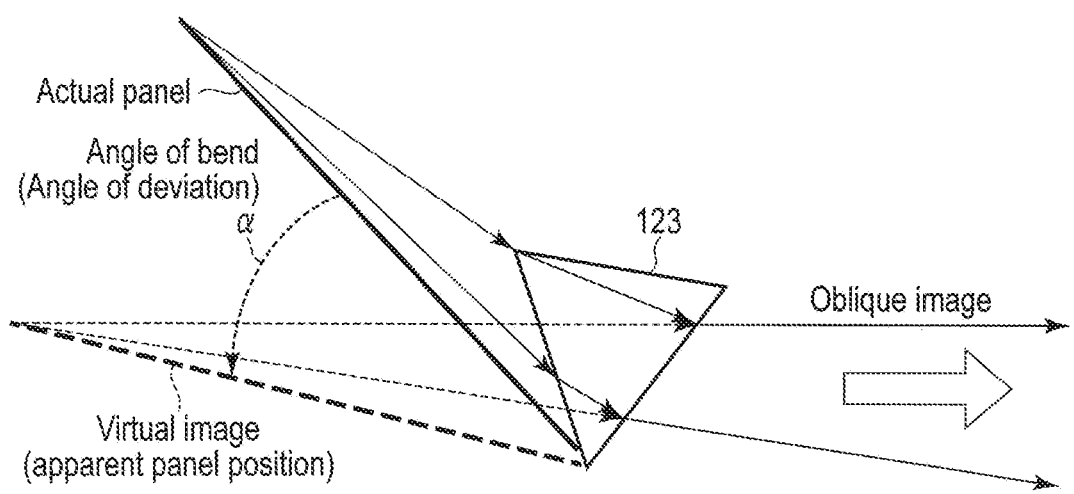
FIG. 3 is an explanatory diagram showing the definition of the angle of bend at which an image is formed by the prism shown in FIG. 2.
Figure 4:
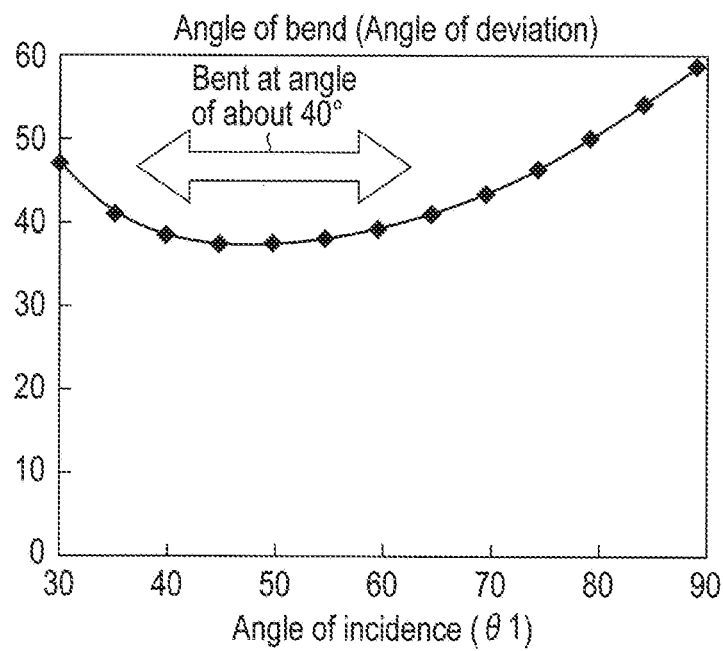
FIG. 4 is an explanatory diagram showing the dependence on the angle of incidence of the prism based on the definition of the angle of bend shown in FIG. 3.

That is, the prism 123 is arranged with respect to the LCD panel 121 as shown in FIG. 3. According to this arrangement, when the display screen of the LCD panel 121 is viewed via the prism 123, a picture image is displayed in the position of an apparent panel which is inclined at the angle of bend α. At this time, as is evident from the dependence of the angle of bend α on the angle of incidence shown in FIG. 4, the angle of bend α is about 40°.

Figure 5:
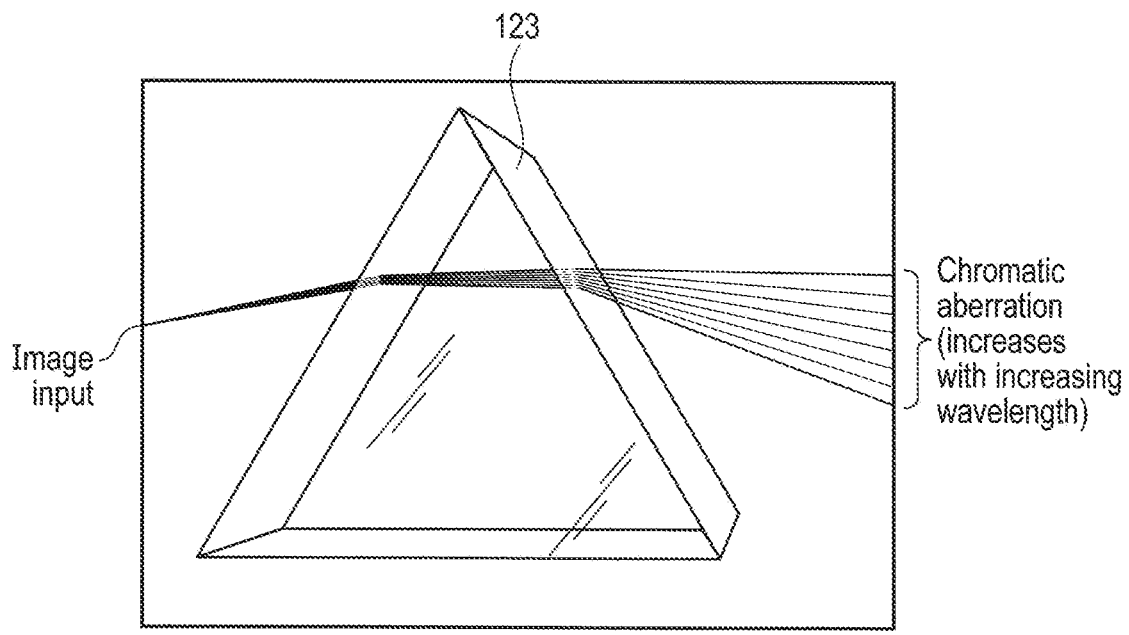
FIG. 5 is an explanatory diagram showing chromatic aberration caused by the prism shown in FIG. 2.

In the meantime, when the prism is used, chromatic aberration (which increases with increasing wavelength) caused by spectral characteristics of the prism shown in FIG. 5 needs to be taken into consideration. Therefore, in the present embodiment, chromatic aberration correction is applied to an image which is to be transmitted through the prism 123 by the correction processing unit 112.

Figure 6B:
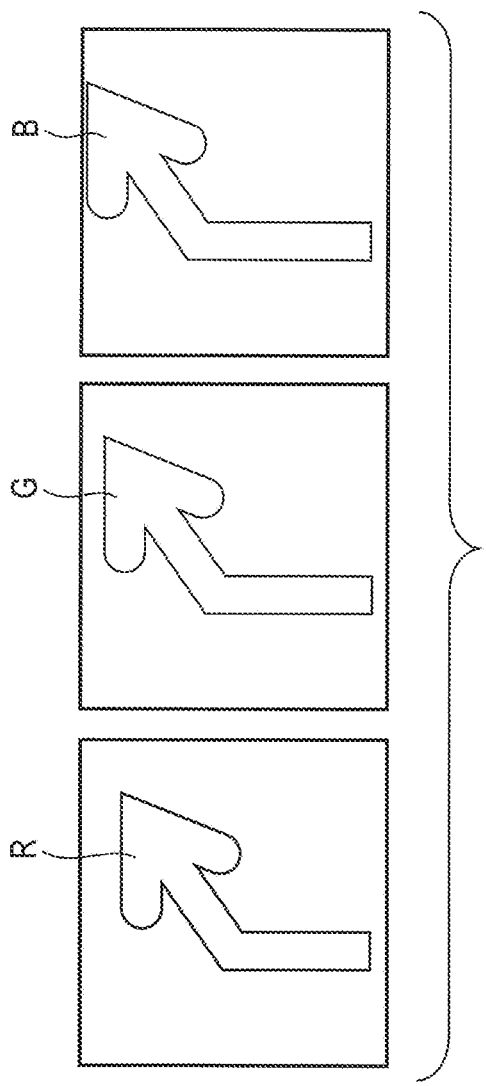
FIGS. 6A, 6B, and 6C are explanatory diagrams showing correction for the chromatic aberration caused by the prism shown in FIG. 5.
Figure 6C:
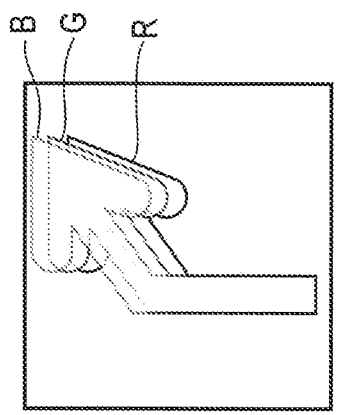
Figure 6A:
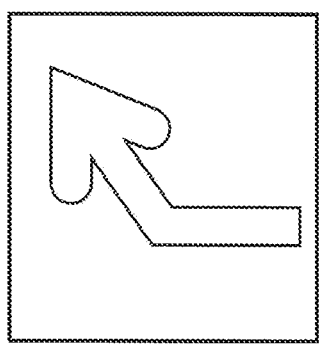

FIGS. 6A, 6B, and 6C show an example of the chromatic aberration correction. In the case of displaying an original image shown in FIG. 6, with respect to RGB color components, the same images are usually displayed in the same pixels. When the original image is viewed through the prism 123, since the output angle varies depending on the wavelength of a color component, chromatic aberration occurs, and the image becomes blurry in the direction of inclination. To prevent the blurriness, as shown in FIG. 6B, the images of the RGB color components are stretched in the direction of inclination, respectively, according to the wavelengths. At this time, the stretch rate is set to have characteristics contrary to the chromatic aberration characteristics of the prism, that is, a color with a shorter wavelength (R<G<B) will have a larger aberration. The RGB compound image which has been corrected for the chromatic aberration is displayed such that the RGB color components are misaligned with each other as shown in FIG. 6C, but since the characteristics contrary to the chromatic aberration will be neutralized by the prism 123, the RGB compound image will look the same as the original image when viewed through the prism 123.

From the above, according to the display device adopting the HUD of the present embodiment, the display screen of the LCD panel 121 is obliquely viewed via the prism 123. Therefore, when the image which is displayed on the LCD panel 121 is projected to the reflection surface on the windshield, the image is inclined in the direction of depth. Here, correction for the chromatic aberration to be caused by the prism 123 is made to the output of the RGB color components according to the respective wavelengths at a stage where the RGB images are to be displayed. Therefore, at a stage where the RGB images are compounded together via the prism 123, the RGB compound image looks the same as the original image and is free from chromatic aberration.

In the following, application examples of the above-described display device will be described.

Second Embodiment

Figure 7:
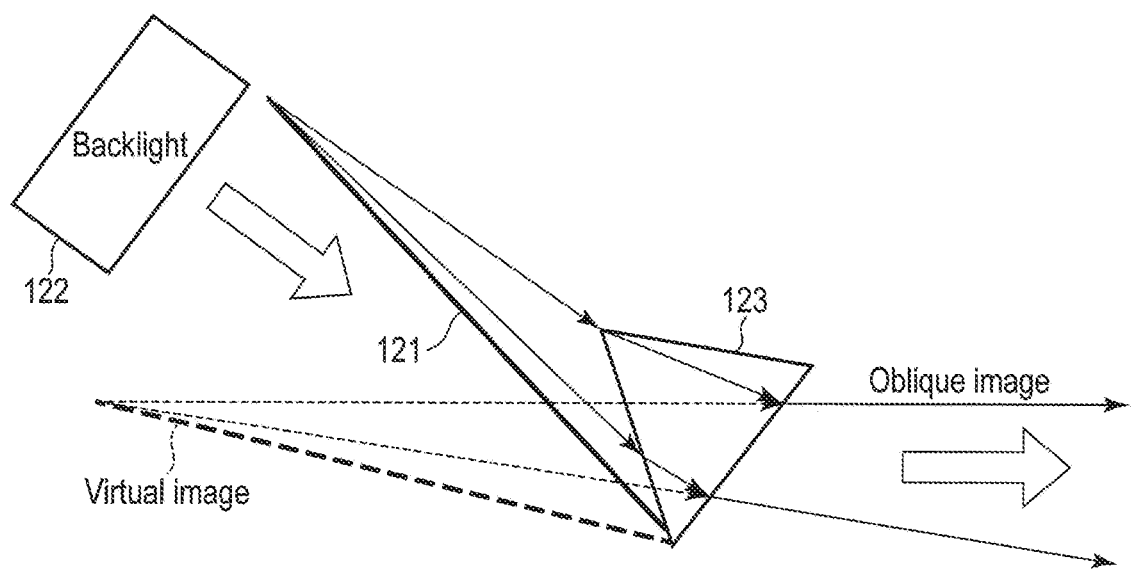
FIG. 7 is a diagram showing another arrangement of a backlight with respect to a display panel of the display device shown in FIG. 1.

According to the optical system device 12 of the above-described structure, since the display image of the LCD panel 121 is obliquely viewed, the LCD panel 121 does not have to be perpendicularly irradiated with the backlight from behind. For example, as shown in FIG. 7, the LCD panel 121 may be irradiated with the light of the backlight source 121 at a predetermined angle from behind. In this case, the best viewing angle characteristics of the LCD can be exhibited in the output direction. Therefore, the amount of the output light can be reduced, and the efficiency of the backlight can be enhanced.

Third Embodiment

Figure 8:
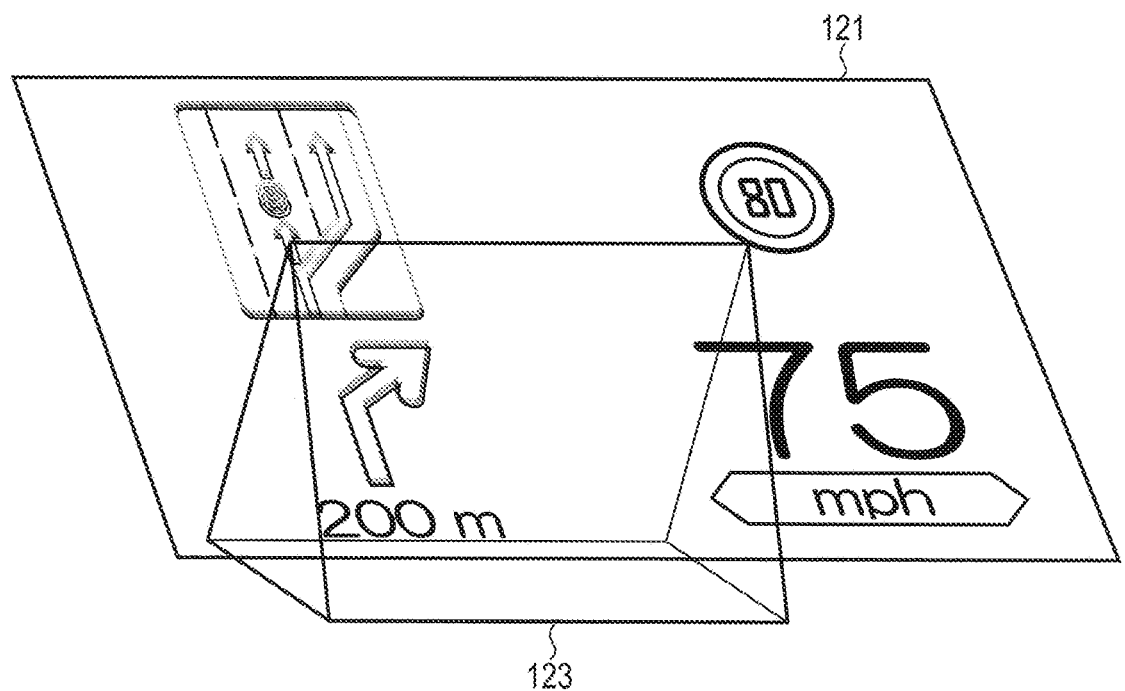
FIG. 8 is a diagram showing a structure in a case where only a part (left part) of an image displayed on the panel is inclined by the prism in the display device shown in FIG. 1.

If the prism 123 is arranged to cover the entire surface of the LCD panel 121, since all images are obliquely displayed, some images such as a road sign and a speed limit will be hard to see. Therefore, as shown in FIG. 8, the prism 123 is arranged to cover one part (left half) of the LCD panel 121, and the other part (right half) of the LCD panel 121 outside the coverage of the prism 123 is directly projected in the present embodiment. In this way, an image within the coverage of the prism 123 will be obliquely displayed, while an image outside the coverage of the prism 123 will not be obliquely displayed but will be vertically displayed.

FIG. 9A shows a display example of the LCD panel 121 in a case where the prism is provided with respect to the left half of the screen as shown in FIG. 8. Here, left images on the display screen, that is, images of a traffic lane and an arrow of a road direction are corrected for chromatic aberration as images to be transmitted through the prism, while right images on the display screen, that is, images of a speed limit and a current speed are not corrected for chromatic aberration since these images will not be transmitted through the prism. In this case, as shown in FIG. 9B, the left half images are obliquely displayed, while the right half images are vertically displayed. In this way, as shown in FIG. 9C, the display device can show the driver the traffic lane and the arrow of the road direction on the left side as oblique images and the speed limit and the current speed on the right side as vertical images on the driver's view ahead of the vehicle.

Fourth Embodiment

Figure 10:
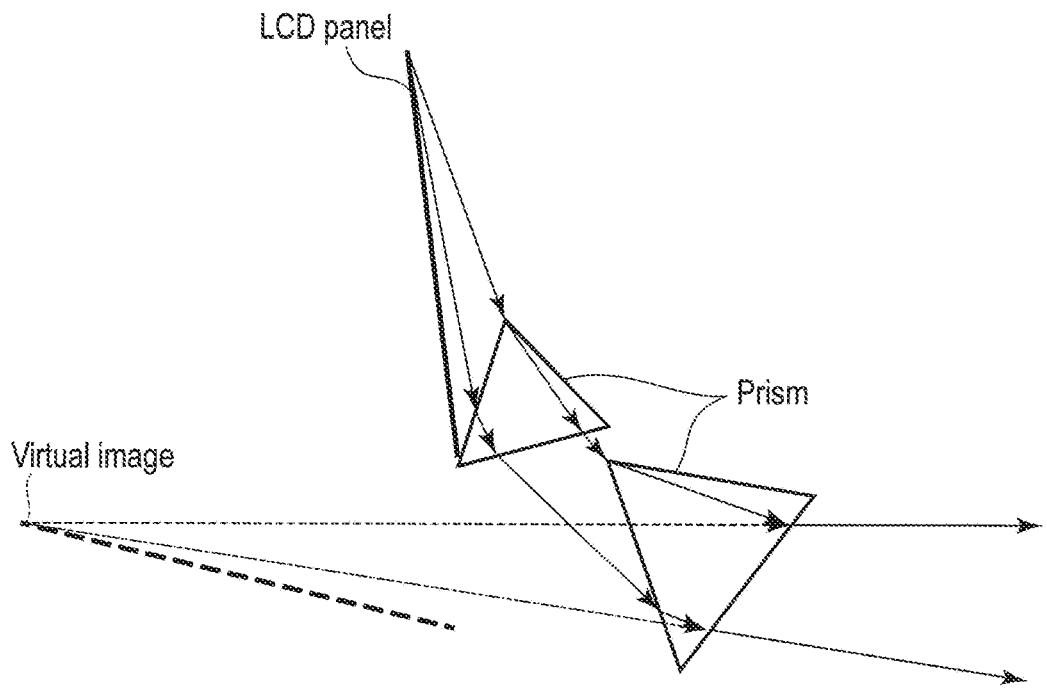
FIG. 10 is a conceptual diagram showing a structure where the angle of bend is increased by use of several prisms in the display device shown in FIG. 1.

In the above-described embodiment, the angle of bend (angle of deviation) is formed between the actual panel position and the apparent panel position by one prism. However, the arrangement area of the prism is laterally restricted by the viewing angle of the LCD panel, and thus the angle of bend (angle of deviation) for one prism is limited to about 37 to 58°. Therefore, as several prisms (two prisms in FIG. 10) are arranged in combination as shown in FIG. 10, the angle of bend (angle of deviation) can be further increased.

Fifth Embodiment

Figure 11:
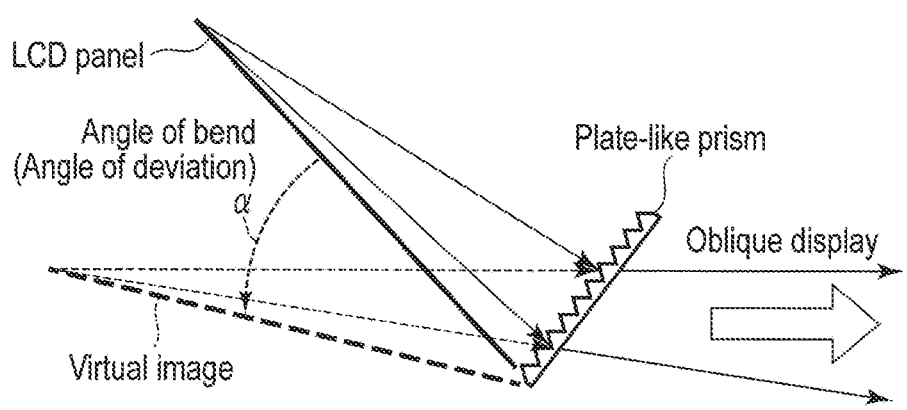
FIG. 11 is a conceptual diagram showing a structure of the prism where small prisms are formed into a plate in the display device shown in FIG. I.

In the above-described embodiment, one equilateral triangular prism is used. However, as shown in FIG. 11, an oblique image may be generated by a plate-like prism where small equilateral triangular prisms are connected to each other and formed into a plate. In this case, the length of the light path from the far end of the panel will be shorter than that of the case of using one equilateral triangular prism, and this may cause the driver a problem with a sense of perspective. Therefore, the correction processing unit 112 provides an original display image with perspective in advance. In this way, the display image will not cause the driver a problem with a sense of perspective.

As described above, the display device adopting the HUD of the present embodiment can realize oblique image display with the optical system which is downsized as compared to those of conventional devices. Further, since the oblique virtual image is optically generated, the image can be naturally displayed. Still further, regarding the chromatic aberration caused by the prism, the chromatic aberration is corrected by the image processing, costly fluorite will not be required, and consequently the cost of the optical element can be reduced. Still further, since the prism is arranged with respect to the panel to cover not all but some display images on the panel, oblique images and vertical images can be simultaneously displayed. Still further, although the angle of bend for the prism whose apex angle is 60° is about 37 to 58°, the angle of bend can be increased by use of several prisms in combination.

Note that, although the display panel has been assumed to be a liquid crystal display panel in the above-described embodiments, the display panel can similarly be achieved also by an organic EL display panel.

In addition, the invention is not limited to the above-described embodiments but may be implemented in various other forms without departing from the spirit of the invention at the stage of implementation. Further, various other inventions may be formed by appropriate combinations of the structural elements described in each embodiment. For example, some of the structural elements described in the embodiment may be deleted. Still further, the structural elements in the different embodiments may also be combined with each other as needed.

What is claimed is:

1. A display device comprising:
   a display panel which displays an image;
   a prism which is arranged so that a plane of incidence inclines at a first predetermined angle with respect to the display panel, inclines the image which is projected from the display panel, and outputs the image at a second predetermined angle;
   a mirror which reflects the image from the prism; and
   a concave mirror which reflects the image from the mirror, wherein
   the image displayed on the display panel is an image obtained by dividing an original image for each of primary color components, and stretching and synthesizing the divided image at a stretch rate for each of the primary color components, respectively, at the stretch rate of each of the primary color components set to have characteristics contrary to chromatic aberration characteristics of the prism such that a shorter an image of a primary color component a larger its wavelength.

2. The display device of claim 1, further comprising a backlight source which projects the image displayed on the display panel.

3. The display device of claim 2, further comprising a windshield which reflects the image from the concave mirror.

4. The display device of claim 2, wherein the backlight source irradiates the display panel from behind at a third predetermined angle.

5. The display device of claim 1, wherein the image for each of the primary color components is stretched in accordance with the angle at which the plane of incidence of the prism inclines with respect to the display panel and a wavelength of the primary color component.

6. The display device of claim 1, wherein the prism inclines one part of the image which is projected from the display panel at the second predetermined angle.

7. The display device of claim 1, further comprising a second prism in addition to the prism, wherein the second predetermined angle is increased by use of the prism and the second prism in combination.

* * * * *